Oct. 22, 1968     E. P. DOANE     3,406,740
TEMPERATURE CONTROL IN MULTI-ZONE HEAT EXCHANGE OPERATION
Filed July 25, 1966     2 Sheets-Sheet 1

INVENTOR
E.P. DOANE
BY Young & Quigg
ATTORNEYS

Oct. 22, 1968  E. P. DOANE  3,406,740

TEMPERATURE CONTROL IN MULTI-ZONE HEAT EXCHANGE OPERATION

Filed July 25, 1966  2 Sheets-Sheet 2

INVENTOR
E.P. DOANE

BY Young & Quigg
ATTORNEYS

United States Patent Office 3,406,740
Patented Oct. 22, 1968

3,406,740
TEMPERATURE CONTROL IN MULTI-ZONE HEAT EXCHANGE OPERATION
Elliott P. Doane, Bartlesville, Okla., assignor to Phillips Petroleum Company, a corporation of Delaware
Filed July 25, 1966, Ser. No. 567,477
5 Claims. (Cl. 165—1)

ABSTRACT OF THE DISCLOSURE

The individual zone temperatures in a multi-zone heat exchange system are controlled by individual heating units which are actuated by individual zone controllers which, in turn, are preset with respect to each other. The individual zone controllers are each operatively connected to a reference-temperature zone, and actuated by the difference in temperature between the corresponding individual temperature zone and the reference-temperature zone. In this way, the temperature of each zone is varied by varying the temperature of the reference-temperature zone.

---

Figure 1:
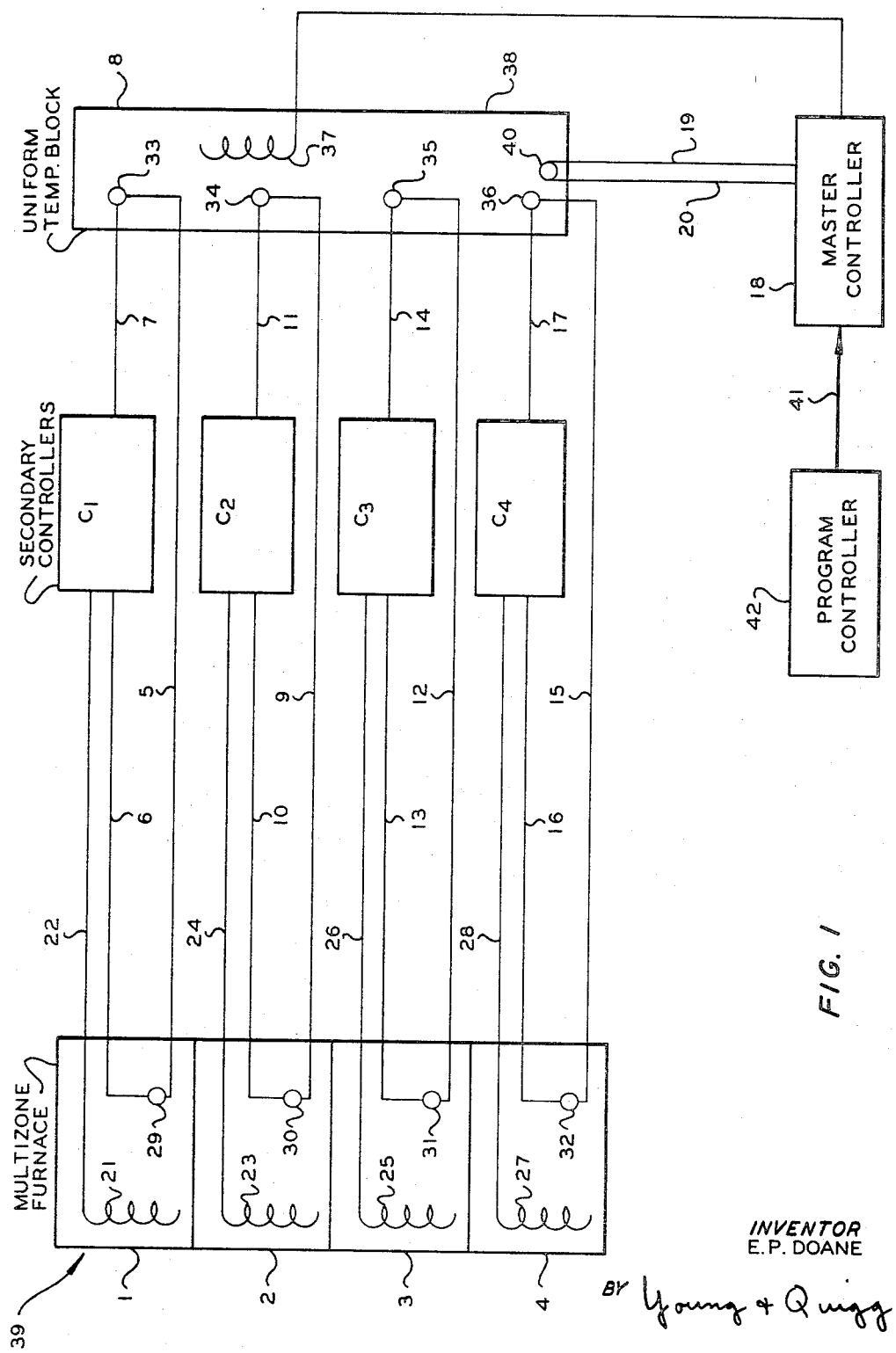

The invention relates to temperature control of heat exchange operations. In another aspect, this invention relates to a novel method of controlling temperature in multi-zone heating operations.

Multi-zone heat exchange devices are used in many chemical reactors and separators. These multi-zone heat exchangers are either a one-unit type heat exchange apparatus which has control temperature zones within the apparatus, or a series of separate heat exchange units. An example of the first type apparatus is a continuous flow catalytic reactor in which it is desired to maintain varying temperature zones within the catalyst bed. An example of the second type apparatus is a continuous flow separation operation in which it is desired to maintain several separate units at different temperatures.

Often it is necessary to change the temperatures simultaneously in these several zones. This is customarily done by having a separate wide-range controller for each zone. These controllers are usually thermocouple activated and the set points of all the controllers must be changed to change the temperature in the furnace system.

In some operations, the temperature change is the same for all the controllers, and this multiple changing invites error and requires controllers for each unit that must independently function over a wide temperature range and an automatic programmer for each controller if the automatic temperature changing is desired. Therefore, it is desirable to have a multi-zone heat exchange control system wherein the set points of all controllers may be changed in one operation without the necessity of changing the set point in each zone separately and thereby requiring much duplication of effort, which also increases the probability of error, and the necessity of expensive wide-range controllers for each zone.

One object of this invention is to provide a method and apparatus whereby temperature variations in multi-zone heat exchange systems can be made by varying the setting of a master controller.

Another object of this invention is to provide a method and apparatus for controlling the zone temperatures of multi-zone heat exchangers by merely presetting the relative zone temperatures with secondary zone controllers and subsequently changing all zone temperatures equally by master control units.

Another object of this invention is to provide a novel method and apparatus for controlling the temperature of a multi-zone heat exchange system whereby individual controllers for each zone control the temperature with respect to each other zone and the temperature of the reference sensing means of the temperature sensing means used to activate these individual zones is controlled by a master controller so that once the temperatures of the individual controllers are set, the temperature of all the zones can be changed by changing the setting of the master controller.

According to the invention, the temperatures in a multi-zone heat exchange system are controlled by first, a series of secondary or slave controllers whereby the temperatures of the individual zones are set with respect to each other, and second, by a uniform temperature zone controlling the temperature of reference temperature sensing elements that are used to activate the secondary or slave controllers for each zone, and third, by a master controller used to control the temperature of the uniform temperature zone. Thus, the secondary or slave controllers have differentially set temperatures with respect to each other, and each has a temperature sensing element in its respective heat exchange zone and a reference temperature sensing element in the commoun uniform temperature zone. A temperature variation in this uniform temperature zone will be transmitted by the reference temperature sensing element; therefore, a change of temperature in the uniform temperature zone will cause the same temperature change to be transmitted to the secondary or slave controllers which in turn will vary all the temperature zones in the heat exchanger by the same amount. The temperature sensing elements used in this invention are either thermocouple junctions or resistance members of a Wheatstone bridge (i.e., resistance thermometers or thermistors) or combinations thereof.

Figure 2:
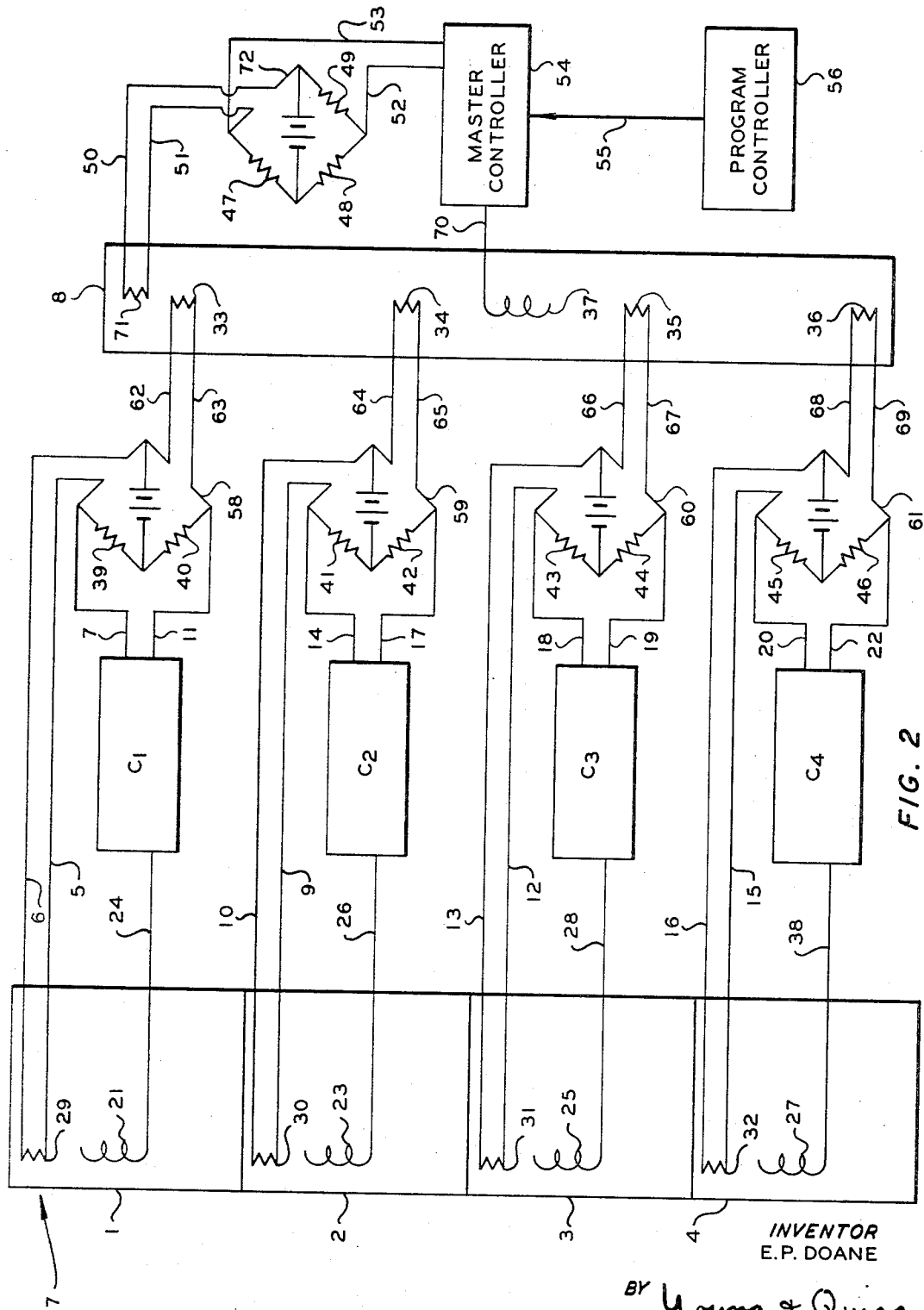

For the better understanding of the apparatus of this invention, reference is made to the accompanying drawing. FIGURE 1 is a schematic illustration of this invention using thermocouple temperature sensing devices. FIGURE 2 is a schematic illustration of this invention using thermistor temperature sensing devices. FIGURES 1 and 2 illustrate multi-zone furnaces, each with four temperature zones, but neither the type of heat exchange device nor the number of control temperature zones illustrated is intended to limit the scope of this invention. This invention can be used to control any number of temperature zones within any multi-zone heat exchange device that is capable of zone temperature variation therein.

Now referring to FIGURE 1, the temperature zones within furnace 39 are numbered 1 to 4 and the corresponding secondary controllers are numbered $C_1$ to $C_4$. The secondary controllers $C_1$, $C_2$, $C_3$ and $C_4$ are connected between the multi-zone furnace and the uniform temperature block by thermocouple leads 6, 7; 10, 11; 13, 14; and 16, 17, respectively. Thermocouple leads 6, 10, 13 and 16 are connected to thermocouple measuring junctions 29, 30, 31 and 32, respectively. Thermocouple leads 7, 11, 14 and 17 are connected to thermocouple reference junctions 33, 34, 35 and 36, respectively. Thermocouple measuring junctions 29, 30, 31 and 32 are connected to reference junctions 33, 34, 35 and 36 by thermocouple leads 5, 9, 12 and 15, respectively. Thermocouple reference junctions 33, 34, 35 and 36 are operatively connected to uniform temperature zone 8. Secondary controllers $C_1$, $C_2$, $C_3$ and $C_4$ are connected to and control the individual zone heating devices 21, 23, 25 and 27 by relay cables 22, 24, 26 and 28, respectively. Master controller 18 is connected to and controls the heating device 37 of the uniform temperature zone by control cable 38 and to thermocouple 40 by control leads 19 and 20. Control leads 19 and 20 connect to heater control means (not shown) for heating device 37.

Thus, in the operation of the multi-zone furnace, secondary controllers $C_1$, $C_2$, $C_3$ and $C_4$ are preset with temperatures $T_1$, $T_2$, $T_3$ and $T_4$ respectively, such that the temperatures of the corresponding furnace zones are $T_0+T_1$, $T_0+T_2$, $T_0+T_3$ and $T_0+T_4$, respectively, where $T_0$ is the temperature of the uniform temperature block. For example, the temperature difference between zones 1 and 2 will be $T_2-T_1$. As the master controller 18 energizes heater 37 and the temperature of the uniform temperature control block 8 changes, the temperature of the reference junction thermocouples 33, 34, 35 and 36 is changed the same amount and this change is registered in controllers $C_1$, $C_2$, $C_3$ and $C_4$. These secondary controllers may be any type of differential temperature activated control units known in the art and may either actuate the zone heating elements through electrical impulse or pneumatic impulse. Therefore, if the temperature of the uniform temperature block is changed from $T_0$ to $T_m$, then the temperatures in zones 1 to 4 will be changed to $T_m+T_1$, $T_m+T_2$, $T_m+T_3$ and $T_m+T_4$, respectively. In this manner, the temperature of all the zones can be changed by an equal value with only one setting on the master control unit.

Many times it will be desirable to control the master controller with a temperature program controller. Temperature program controller 42 is shown in FIGURE 1 connecting master controller 18 by control cable 41. This is often necessary when the conditions in the heat exchanger or the reactants require that the temperature be varied a predetermined value per unit time. For example, in a continuous flow catalytic type reactor, the catalyst bed slowly becomes deactivated during the operation of the system; consequently, it is necessary to heat the bed to compensate for this deactivation. The bed will be more strongly deactivated at the point where the reactants enter the bed and will become proportionally less deactivated along the length of the bed. Therefore, it is necessary to heat the upstream part of the catalyst bed to a higher temperature than the downstream part of the bed and to in fact form a temperature gradient along the length of the bed. This temperature gradient can easily be divided into temperature zones, and the differential zone temperatures preset with a secondary controller of this invention. Also, it is necessary to raise the temperature of all zones a predetermined value per unit time to further offset bed deactivation. This may be accomplished by using a temperature program controller to operate the master controller. Therefore, with the use of the temperature program controller, not only is a temperature gradient established over the length of the column, but the temperature of each zone is raised a predetermined value per unit time.

FIGURE 2 is a schematic illustration of another embodiment of this invention using thermistor temperature sensing devices. The temperature zones within furnace 57 are numbered 1 to 4, and the corresponding secondary controllers are numbered $C_1$ to $C_4$. The secondary controllers $C_1$, $C_2$, $C_3$ and $C_4$ are connected to Wheatstone bridges by leads 7, 11; 14, 17; 18, 19 and 20, 22, respectively. Wheatstone bridge 58 comprises resistances 40 and 39, thermistor 29 located within heat zone 1 connected to said bridge by leads 5 and 6, thermistor 33 located in uniform temperature block 8 connected to said bridge by leads 62 and 63. Bridge 59 comprises resistances 42 and 41, thermistor 30 located in heat zone 2 connected to bridge 59 by leads 9 and 10, and thermistor 34 located in uniform temperature block 8 connected to bridge 59 by leads 64 and 65. Bridge 60 comprises resistances 44 and 43, thermistor 31 located in heat zone 3 connected to bridge 60 by leads 12 and 13, and thermistor 35 located in uniform temperature block 8 connected to bridge 60 by leads 66 and 67. Bridge 61 comprises resistances 46 and 45, thermistor 32 located in heat zone 4 connected to bridge 61 by leads 15 and 16, and thermistor 36 located in uniform temperature block 8 connected to bridge 61 by leads 68 and 69. Secondary controllers $C_1$, $C_2$, $C_3$ and $C_4$ are connected to the individual zone heating devices 21, 23, 25 and 27 by relay cables 24, 26, 28 and 38, respectively. Master controller 54 is connected to heating device 37 of uniform temperature zone 8 by control cable 70, and to bridge 72 by leads 52 and 53. Bridge 72 comprises resistances 47, 48 and 49, and thermistor 71 connecting said bridge by leads 50 and 51. Control leads 52 and 53 connect to heat control means (not shown) for heating device 37. Temperature program controller 56 is shown connecting master controller 54 by control cable 55.

The control elements of this invention are illustrated schematically in order to simplify the description. Heaters 21, 23, 25, 27 and 37 in FIGURES 1 and 2 can be electrical heaters or coils through which a heating fluid is passed, for example. If electrical heaters are employed, the controllers regulate the current to the elements. If fluid coils are employed, the controllers can adjust the valve to regulate the flow of fluid through the coils. The controllers can be of the "on-off" or proportional type. As an alternative, the system of this invention can be employed to cool sections of a multi-zone heat exchanger selectively. As above mentioned, the secondary controllers may be any type of differential temperature activated control unit known in the art. Examples of such control units are the differential temperature activated control units manufactured by Corning Company, Esterline-Angus Company, and the unit sold under the trademark of "Amplitrol" made by Thermo-Electric Company.

It will be apparent to those skilled in the art that changes may be made in the forms of the apparatus disclosed without departing from the spirit of the invention as set forth in the appended claims, and in some cases certain features of my invention may be used to advantage without a corresponding use of other features.

I claim:
1. A method of controlling temperature in multi-zone heat exchangers with temperature sensing devices comprising: sensing the temperature of each heat exchange zone, sensing the temperature of a reference temperature zone, varying the temperature of each heat exchange zone in response to the difference between the sensed temperature of such zone and the sensed temperature of said reference zone, and varying the temperature of said reference zone so as to change each of the temperature differences which are employed to vary the temperature of said heat exchange zones.

2. In a system for controlling the temperature in a multi-zone heat exchange apparatus having heating means associated with each zone, means for controlling the actuation of each heating means comprising: zone temperature sensing means associated with each heat exchange zone means, reference temperature sensing means connected to said zone temperature sensing means, a reference temperature means to which every reference temperature sensing means is connected to maintain said reference temperature sensing means at the same controlled temperature, a master control means associated with said reference temperature means to adjust the temperature thereof, individual zone control means interconnected between each zone temperature sensing means and reference temperature sensing means, and means responsive to each of said individual zone control means to adjust the heating means associated therewith.

3. Apparatus of claim 2 having a temperature program controller means associated with said master controller means to adjust the set point of said master controller means, whereby the temperature of said control temperature means is varied.

4. Apparatus of claim 2 wherein said zone temperature sensing means and said reference temperature sensing means are thermocouple junction means.

5. Apparatus of claim 2 wherein said zone temperature sensing means and said reference temperature sensing means are thermistor elements of a Wheatstone bridge.

References Cited
UNITED STATES PATENTS 3,267,994   8/1966   Sones et al. _____ 165—28

ROBERT A. O'LEARY, *Primary Examiner.*

CHARLES SUKALO, *Assistant Examiner.*